(12) United States Patent
Nichols et al.

(10) Patent No.: US 12,433,612 B2
(45) Date of Patent: Oct. 7, 2025

(54) METHOD, APPARATUS, AND COMPUTER PROGRAM PRODUCT FOR BONE ALIGNMENT FOR SYNDESMOSIS FIXATION

(71) Applicant: UNIVERSITY OF FLORIDA RESEARCH FOUNDATION, INC., Gainesville, FL (US)

(72) Inventors: Jennifer A. Nichols, Gainesville, FL (US); Christopher Reb, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 907 days.

(21) Appl. No.: 17/649,839

(22) Filed: Feb. 3, 2022

(65) Prior Publication Data
US 2022/0249105 A1 Aug. 11, 2022

Related U.S. Application Data

(60) Provisional application No. 63/146,254, filed on Feb. 5, 2021.

(51) Int. Cl.
*A61B 17/17* (2006.01)
*A61B 17/04* (2006.01)
(Continued)

(52) U.S. Cl.
CPC ...... *A61B 17/1703* (2013.01); *A61B 17/0401* (2013.01); *A61B 17/8061* (2013.01); *A61B 34/10* (2016.02)

(58) Field of Classification Search
CPC .......... A61B 17/1703; A61B 17/0401; A61B 17/8061; A61B 34/10
See application file for complete search history.

(56) References Cited

FOREIGN PATENT DOCUMENTS

WO    WO-2021054554 A1 *   3/2021    ......... A61B 17/1703

OTHER PUBLICATIONS

Kennedy, M.T. et al. A Computed Tomography Evaluation of Two Hundred Normal Ankles, to Ascertain What Anatomical Landmarks to Use When Compressing or Placing an Ankle Syndesmosis Screw, *The Foot*, vol. 24, No. 4, pp. 157-160, Jul. 3, 2014, DOI: 10.1016/j.foot.2014.07.001.
(Continued)

*Primary Examiner* — Sameh R Boles
(74) *Attorney, Agent, or Firm* — ALSTON & BIRD LLP

(57) ABSTRACT

Provided herein is a method, apparatus, and computer program product for bone alignment for syndesmosis fixation, and more particularly, to using two-dimensional images for three-dimensional reconstruction for center-center alignment of bones for syndesmosis fixation. Methods include: obtaining at least one two-dimensional image of a first bone and a second bone; identifying edges of each of the first bone and the second bone from the at least one two-dimensional image; identifying centerlines of each of the first bone and the second bone from the at least one two-dimensional image; and determining limb position and drill targets based on the identified centerlines. Methods may further include to provide feedback to a surgeon including interactive drill targeting of a location on at least one of the first bone and the second bone.

19 Claims, 10 Drawing Sheets

(51) Int. Cl.
A61B 17/80 (2006.01)
A61B 34/10 (2016.01)

(56) References Cited

OTHER PUBLICATIONS

Kubik, J.F. "Assessment of Malreduction Standards for the Syndesmosis in Bilateral CT Scans of Uninjured Ankles," *The Bone & Joint Journal*, vol. 103-B, No. 1, pp. 178-183, 2021, Jan. 2021, DOI: 10.1302/0301-620X.103B1.BJJ-2020-0844.R1.

Cancienne, Jourdan M. et al. "Center-Center Syndesmosis Fixation Technique," *Techniques in Foot & Ankle Surgery*, vol. 14, No. 3, pp. 134-138, Sep. 2015.

Jackson, Nicholas J. et al. "Computational Comparison of Center-Center and Centroid Axes in Syndesmosis Fixation," *ORS Conference Abstract*, (Year: 2021), (3 pages).

Haupt, Edward Thomas et al. "Computed Tomographic Validation of the Center-Center Radiographic Technique for Syndesmosis Fixation Axis Alignment in Normal Ankles," *Foot & Ankle International*, vol. 41, No. 9, pp. 1143-1148, Sep. 1, 2020 (ePub: Jul. 14, 2020), DOI: 10.1177/1071100720936215.

\* cited by examiner

METHOD, APPARATUS, AND COMPUTER PROGRAM PRODUCT FOR BONE ALIGNMENT FOR SYNDESMOSIS FIXATION

CROSS-REFERENCE TO RELATED APPLICATIONS

This application claims priority to U.S. Provisional Patent Application No. 63/146,254, filed on Feb. 5, 2021, the contents of which are hereby incorporated by reference in their entirety.

TECHNOLOGICAL FIELD

An example embodiment of the present disclosure relates to a method, apparatus, and computer program product for bone alignment for syndesmosis fixation, and more particularly, to using two-dimensional images for center-center alignment of bones for syndesmosis fixation and providing feedback associated with the alignment.

BACKGROUND

Joint injuries are some of the most common forms of musculoskeletal injuries while the fixation of these injuries is complicated by the need to maintain mobility once fixation is complete. Syndesmosis is a form of fibrous joint in which opposing bone surfaces are united by ligaments. Examples of these joints include the fibrous union between the radius and ulna which forms the radioulnar syndesmoses and the fibrous union between the tibia and fibula which forms the tibiofibular syndesmoses.

Syndesmosis injuries can occur when the ligamentous connection between the joined bones is catastrophically damaged. Repair of a syndesmosis injury is often performed through syndesmosis fixation in which anatomical alignment is made between the affected bones and the bones are fixed in place by a fastening means.

BRIEF SUMMARY

Embodiments of the present disclosure provide a method, apparatus, and system for bone alignment for syndesmosis fixation, and more particularly, to using two-dimensional images for three-dimensional reconstruction for center-center alignment of bones for syndesmosis fixation. Embodiments include an apparatus including processing circuitry and at least one memory including computer program code, the at least one memory and the computer program code configured to, with the processing circuitry, cause the apparatus to at least: obtain at least one two-dimensional image of a first bone and a second bone; identify edges of each of the first bone and the second bone from the at least one two-dimensional image; identify centerlines of each of the first bone and the second bone from the at least one two-dimensional image; and determine at least one of limb position or drill targets based on the identified centerlines. Causing the apparatus to obtain the at least one two-dimensional image of the first bone and the second bone includes causing the apparatus to obtain two or more two-dimensional images captured from at least two different angles of the first bone and the second bone, where the apparatus is further caused to generate a three-dimensional reconstruction and/or a digitally reconstructed radiograph of the first bone and the second bone from the two or more two-dimensional images.

According to an example embodiment, the first bone and the second bone are a pair of bones requiring syndesmosis fixation. Causing the apparatus of some embodiments to identify edges of each of the first bone and the second bone includes causing the apparatus to: filter the at least one two-dimensional image to obtain a filtered image; apply a binary threshold to the filtered image to obtain a binary image; and identify edges of at least one of the first bone and the second bone from the binary image. Causing the apparatus of some embodiments to identify edges of each of the first bone and the second bone includes causing the apparatus to: apply a binary threshold to the at least one two-dimensional image to identify edges of the first bone; and determine pixel density within the at least one two-dimensional image to identify edges of the second bone. According to some embodiments, the edges of the second bone are disposed between the edges of the first bone in the at least one two-dimensional image.

The apparatus of some embodiments is caused to provide an indication of alignment between the first bone and the second bone based on the identified centerlines. In response to the first bone being fixed to the second bone to become a fixed limb, the apparatus of an example embodiment is further caused to: calculate translation and rotation between the fixed limb and a baseline limb using vectors from a centroid of the first bone to the centroid of the second bone; and provide an indication of alignment between the first bone and the second bone based on the calculated translation and rotation. The apparatus of some embodiments is caused to generate at least one mark on the two-dimensional image defining a point on at least one of the first bone and the second bone for a drilling location. The apparatus of some embodiments is further caused to provide feedback to a surgeon regarding how to change position of a limb containing the first and second bone relative to an image capture device of the at least one two-dimensional image to obtain alignment between the identified centerlines. The apparatus of some embodiments is caused to provide feedback to a surgeon including interactive drill targeting of a location on at least one of the first bone and the second bone.

Embodiments described herein provide a computer program product including at least one non-transitory computer-readable storage medium having computer-executable program code instructions stored therein, the computer-executable program code portions including program code instructions configured to: obtain at least one two-dimensional image of a first bone and a second bone; identify edges of each of the first bone and the second bone from the at least one two-dimensional image; identify centerlines of each of the first bone and the second bone from the at least one two-dimensional image; and determine at least one of limb position or drill targets based on the identified centerlines. The program code instructions to obtain at least one two-dimensional image of a first bone and a second bone include program code instructions to obtain two or more two-dimensional images captured from at least two different angles of the first bone and the second bone, where the computer program product further includes program code instructions to: generate a three-dimensional reconstruction and/or a digitally reconstructed radiograph of the first bone and the second bone from the two or more two-dimensional images.

According to an example embodiment, the first bone and the second bone are a pair of bones requiring syndesmosis fixation. The computer program code instructions to identify edges of each of the first bone and the second bone include program code instructions to: apply a binary threshold to the at least one two-dimensional image to identify edges of the first bone; and determine pixel density within the at least one two-dimensional image to identify edges of the second bone. According to some embodiments, the edges of the second bone are disposed between the edges of the first bone in the at least one two-dimensional image. Embodiments may include program code instructions to generate at least one mark on the at least one two-dimensional image defining a point on at least one of the first bone or the second bone for a drilling location. Embodiments may include program code instructions to provide feedback to a surgeon regarding how to change position of a limb containing the first bone and the second bone relative to an image capture device of the at least one two-dimensional image to obtain alignment between the identified centerlines. Embodiments may include program code instructions to provide feedback to a surgeon including interactive drill targeting of a location on at least one of the first bone and the second bone.

Embodiments provided herein include a method including: obtaining at least one two-dimensional image of a first bone and a second bone; identifying edges of each of the first bone and the second bone from the at least one two-dimensional image; identifying centerlines of each of the first bone and the second bone from the at least one two-dimensional image; and determining at least one of limb position or drill targets based on the identified centerlines. Obtaining at least one two-dimensional image of a first bone and a second bone may include obtaining two or more two-dimensional images captured from at least two different angles of the first bone and the second bone, where the method further includes generating a three-dimensional reconstruction and/or a digitally reconstructed radiograph of the first bone and the second bone from the two or more two-dimensional images.

DETAILED DESCRIPTION

Figure 1:
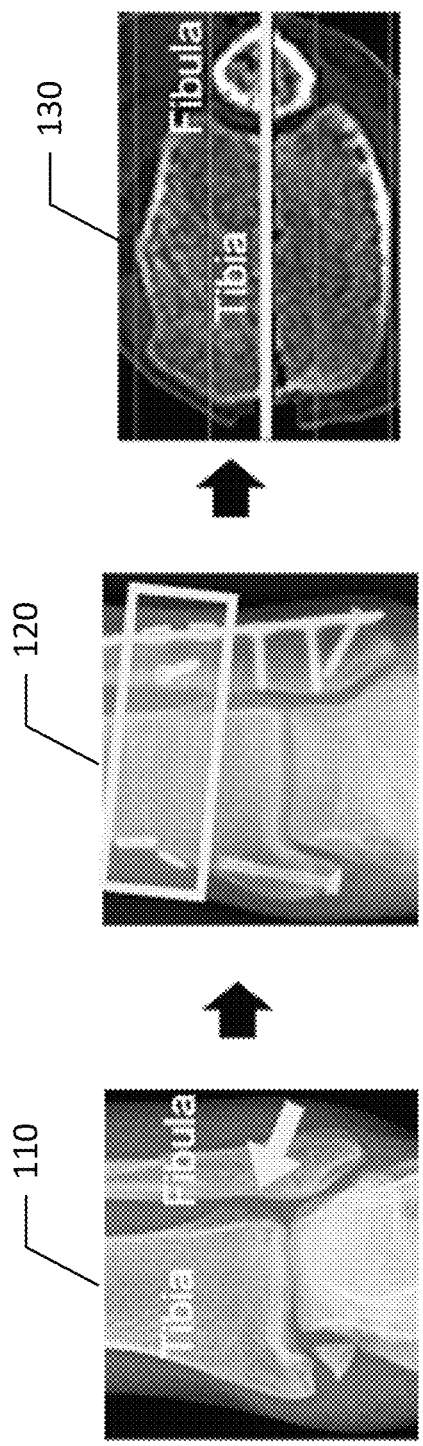
FIG. 1 illustrates an example embodiment of the ligamentous connection between a distal tibia and fibula according to an embodiment of the present disclosure.

Some example embodiments of the present disclosure will now be described more fully hereinafter with reference to the accompanying drawings, in which some, but not all embodiments of the invention are shown. Indeed, various embodiments of the disclosure may be embodied in many different forms and should not be construed as limited to the example embodiments set forth herein; rather, these example embodiments are provided so that this disclosure will satisfy applicable legal requirements. Like reference numerals refer to like elements throughout.

Embodiments of the present disclosure include a method, apparatus, and system for bone alignment for syndesmosis fixation, and more particularly, to using two-dimensional images for three-dimensional reconstruction for center-center alignment of bones for syndesmosis fixation. While embodiments described herein are described primarily with respect to tibiofibular syndesmosis fixation, embodiments may be employed with other syndesmosis fixation types and more generally with other fluoroscopy-guided drilling procedures with beneficial results.

Syndesmosis injuries occur when the ligamentous connection between two bones is catastrophically damaged. FIG. 1 illustrates an example embodiment of the ligamentous connection between a distal tibia and fibula having been damaged in the left-most image 110. Syndesmosis injuries are conventionally treated surgically using syndesmosis fixation. In the case of a tibiofibular fixation, the fibula and tibia are surgically realigned and fixed, as shown at image 120 of FIG. 1. The goal of syndesmosis fixation being to restore anatomical alignment between the tibia and fibula, shown in image 130 of FIG. 1.

Successfully treating ankle syndesmosis injuries is a challenge as malreduction (i.e., incorrect alignment) of the tibia and fibula is prevalent. Malreduction has debilitating consequences including altered ankle joint mechanics, chronic pain, joint instability, and osteoarthritis and may also be associated with a need for revision surgery. Syndesmotic malreduction is costly in terms of both physical and financial health. Embodiments described herein provide an improved method of syndesmosis fixation that is particularly beneficial to ankle syndesmosis. Surgical fixation of the ankle syndesmosis is technically challenging due to psychomotor multitasking. Syndesmosis fixation requires repetitive psychomotor multitasking to acquire and interpret the intraoperative images, manually position a patient's ankle, and operate the surgical instruments. Further, conventional syndesmosis fixation techniques do not account for patient-specific differences in anatomy, thereby increasing the likelihood of malreduction.

Figure 2:
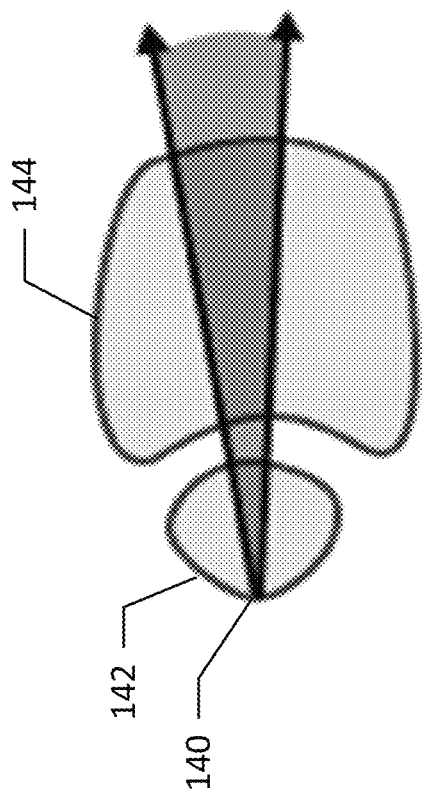
FIG. 2 is a schematic illustration of syndesmosis fixation according to an example embodiment of the present disclosure.
Figure 3:
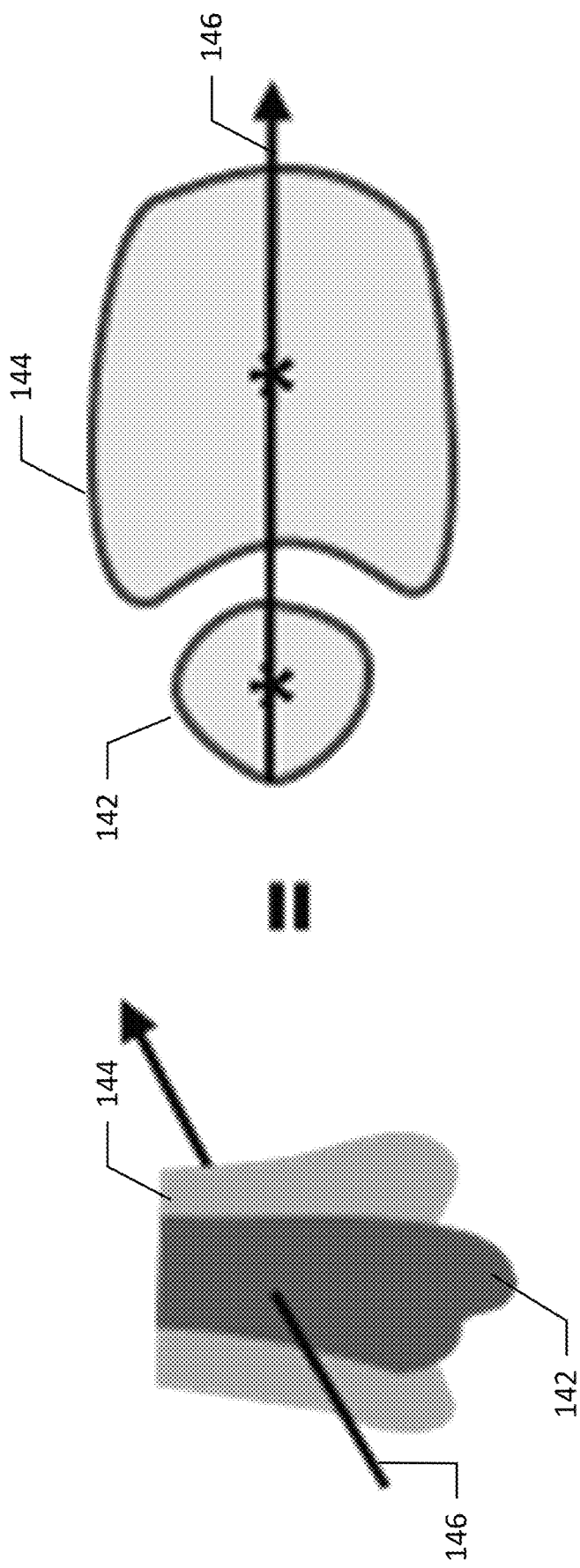
FIG. 3 is a schematic illustration of a center-center technique of syndesmosis fixation according to an example embodiment of the present disclosure.

The surgical technique for performing syndesmosis fixation involves drilling of a hole at about a 30-degree angle from the posterolateral to anteromedial. FIG. 2 is a schematic illustration of this technique in which a hole 140 is drilled through the fibula 142 into the tibia 144. For this technique, intraoperative imaging (e.g., fluoroscopy) is used to verify that fixation (e.g., screws or suture-button(s)) are inserted at an appropriate level and in a manner parallel to the joint line. Intraoperative imaging is not used to guide drilling. An alternative surgical technique, schematically illustrated in FIG. 3, is the center-center technique. In this technique, the drill path 146 is selected by centering the fibula within the tibia on a lateral fluoroscopic image. Because the center-center technique only requires readily available fluoroscopic imaging, this approach can be widely implemented. However, minor changes to patient limb position or imaging plane can substantially affect the visualized center-center alignment. Embodiments provided herein provide a solution for guidance of a center-center technique to assist surgeons in obtaining a center-center image, to guide surgical drilling using the center-center technique, and to provide feedback associated with alignment of the bones.

Embodiments described herein use a software-based system for identifying center-center alignment of the tibia and fibula from fluoroscopic images, provide visual feedback to the surgeon regarding alignment to guide intraoperative drilling, and quantify the quality of the achieved alignment following fixation. Embodiments are adaptable to guide other fluoroscopy-guided drilling procedures, such as fixation of the spine, pelvis, humerus, femur, and metacarpal, for example.

Figure 4:
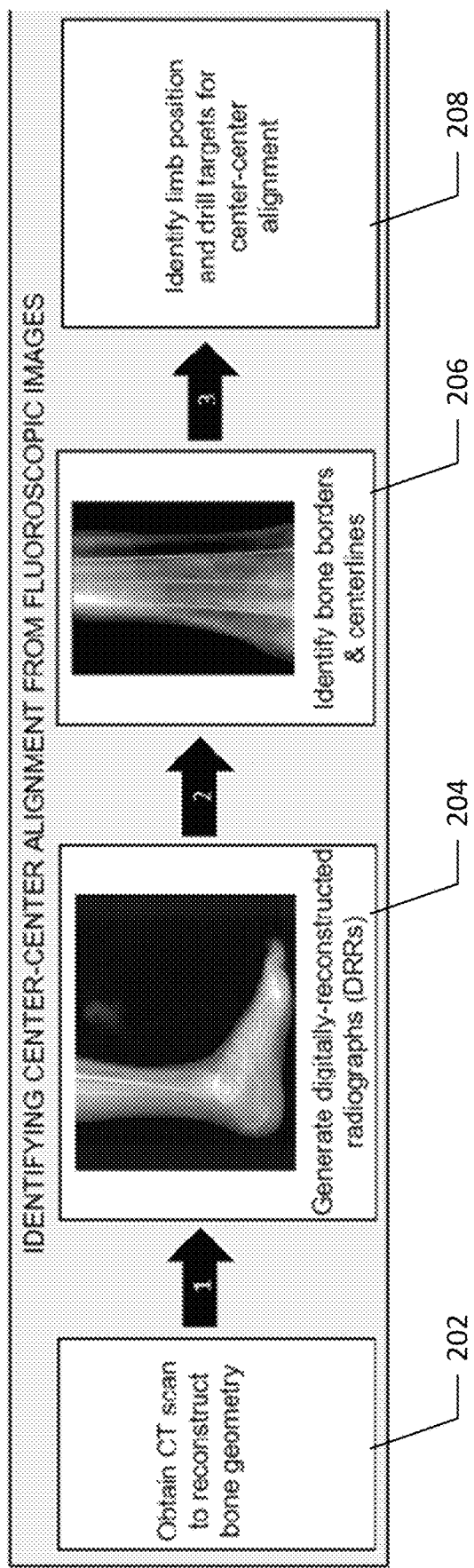
FIG. 4 is a diagram of a process for identifying center-center alignment from fluoroscopic images according to an embodiment of the present disclosure.

To perform the center-center technique, a surgeon first obtains a center-center image where the fibula is centered within the tibia on a lateral view. Embodiments described herein provide approaches for identifying the center-center alignment from digitally reconstructed radiographs and fluoroscopic images. The methods described herein use digitally reconstructed radiographs (DRRs) for preoperative surgical planning. This process involves obtaining a Computerized Tomography (CT) scan (or equivalent volumetric images, such as Magnetic Resonance Imaging (MRI)) to reconstruct the patient's bone geometry through segmentation methods. DRRs are then obtained via ray-cast projection through the reconstructed bone geometry. FIG. 4 illustrates the process described herein of identifying center-center alignment from fluoroscopic images with the CT scan obtained at 202 for reconstruction of bone geometry. The DRRs are generated at 204 from the obtained CT scans. By varying the orientation of the projected x-rays, the DRRs corresponding to any limb position can be generated. The fluoroscopic images are anatomically analyzed (as described further below) to identify the borders or edges of the tibia and fibula as well as the centerlines of each of these bones at 206. The identified bone borders and centerlines can then be used to identify at least one of the limb position and drill targets necessary for achieving center-center alignment as shown at 208. Specifically, center-center alignment is achieved when centerlines of the tibia and fibula overlap. The limb position is correlated to the orientation of the projected x-rays. In the preoperative setting, this data can be used to inform at least one of limb position and drilling location for syndesmosis fixation. Embodiments provide a method to determine limb position, to determine drill targets, or to determine both limb position and drill targets.

Figure 5:
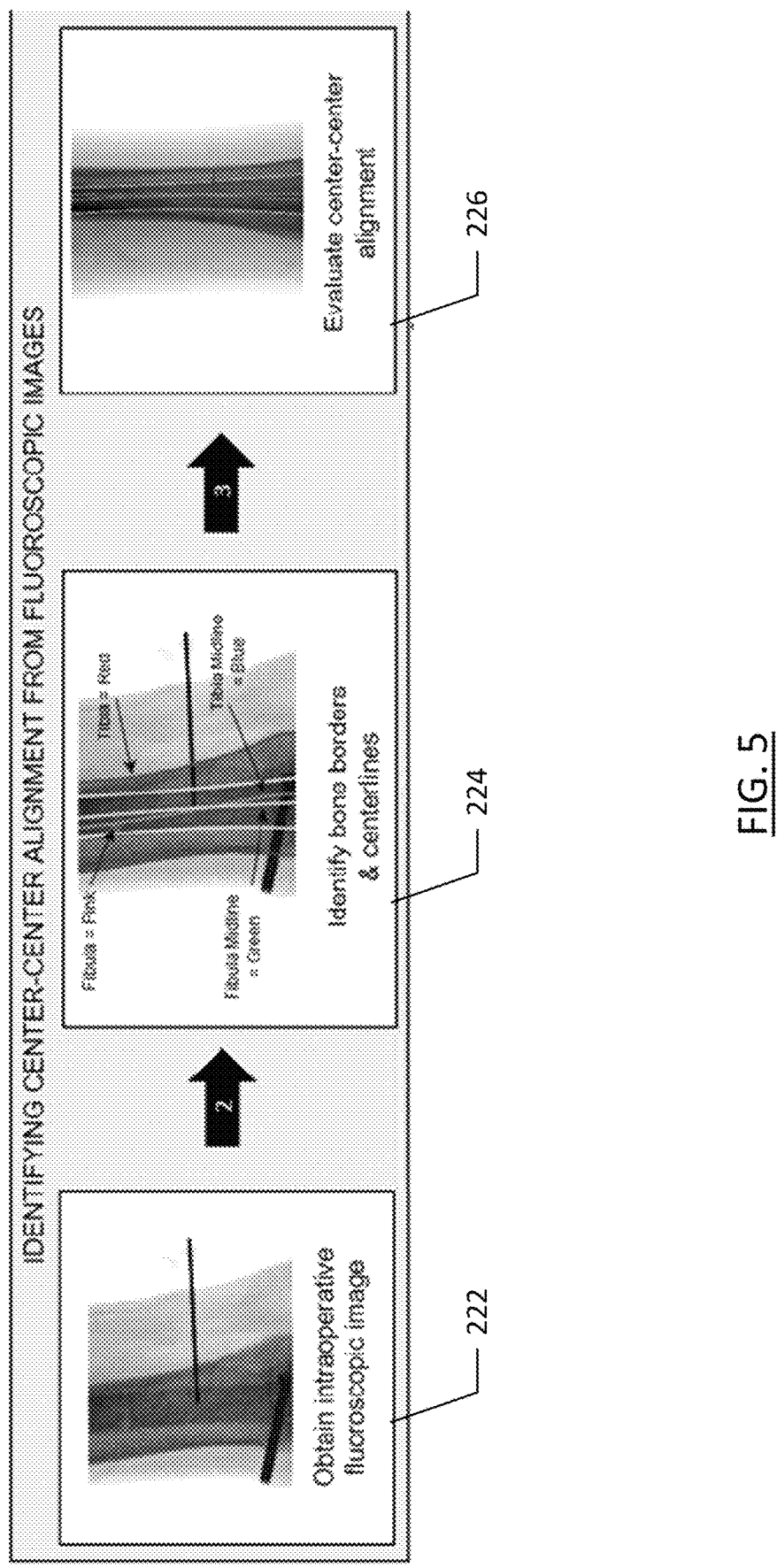
FIG. 5 is a diagram of another process for identifying center-center alignment from fluoroscopic images according to an embodiment of the present disclosure.

Fluoroscopic images can be used in a manner similar to that of using DRRs for intraoperative surgical guidance as described herein. FIG. 5 illustrates an example in which fluoroscopic images (or equivalent 2-dimensional images such as x-ray) are obtained at 222. In a manner similar to that described above for the DRRs, the borders (edges) and centerlines of the fibula and tibia can be identified as shown in 224. From the centerlines it can be determined whether or not a center-center image is achieved at 226. In the intraoperative setting, this information can be provided to the surgeon as feedback.

Feedback can be provided in different manners to a surgeon. Active feedback and passive feedback. Passive feedback includes markings or scales on a fluoroscopic image. This is illustrated as 232 in FIG. 6. The markings provide an indication to the surgeon of the position of the bones, the drill, or both. These markings or scales on the fluoroscopic images assist the surgeon in correctly interpreting the intraoperative fluoroscopic images. A single hash mark or crosshair at the center of the tibia can improve the accuracy with which surgeons can correctly identify center-center alignment.

Figure 6:
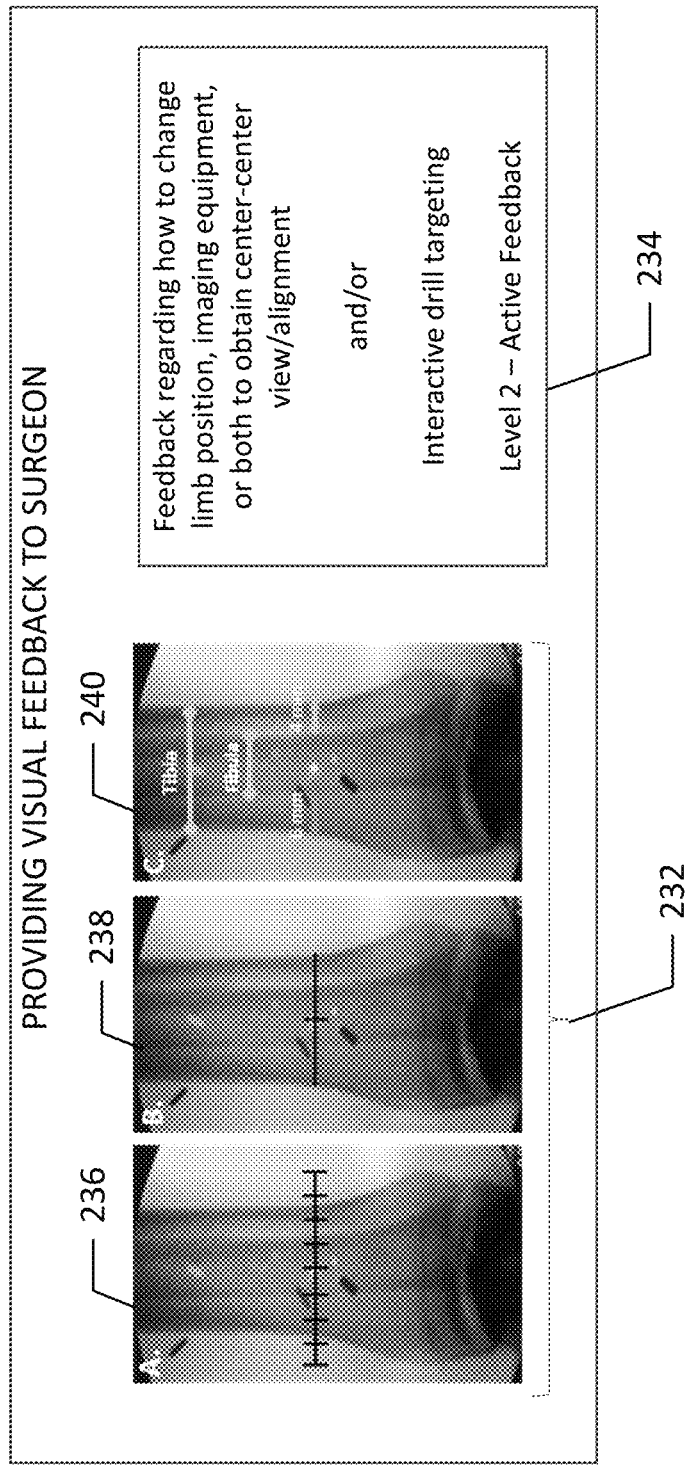
FIG. 6 is a diagram of a process of providing visual feedback to a surgeon according to an example embodiment of the present disclosure.

The center-center method for syndesmosis fixation requires accurately interpreting lateral fluoroscopic (x-ray) images of the ankle. When implementing the center-center technique, a surgeon must be able to accurately identify when the fibula is perfectly centered within the tibia. The center of the fibula, which is centered within the tibia, then becomes the drilling target for syndesmosis fixation. Correctly interpreting center-center images is a challenging skill to acquire and implement. Further, image interpretation errors can contribute to iatrogenic malreduction. Embodiments provide a method to accurately interpret center-center images including visual cues. As shown in FIG. 6, these visual cues can include a graded scale in image 236 and/or a crosshair in image 238. The crosshair, placed at the center of the tibia, provides an intuitive drill target that is easily understood and used. The crosshair of image 238 is particularly useful both in scenarios where the fibula is centered within the tibia from left-to-right, and where the fibula is not be centered within the tibia from left-to-right, as depicted in image 240 where the fibula is displaced anteriorly such that it is not perfectly centered within the tibia.

Beyond passive feedback as described above, embodiments may provide active feedback that includes dynamic surgical guidance to assist the surgeon with appropriately altering the limb position, imaging equipment, or both to obtain a center-center view as shown in 234. Active feedback can be incorporated into robotic surgical guidance systems to enable interactive drill targeting.

Figure 7:
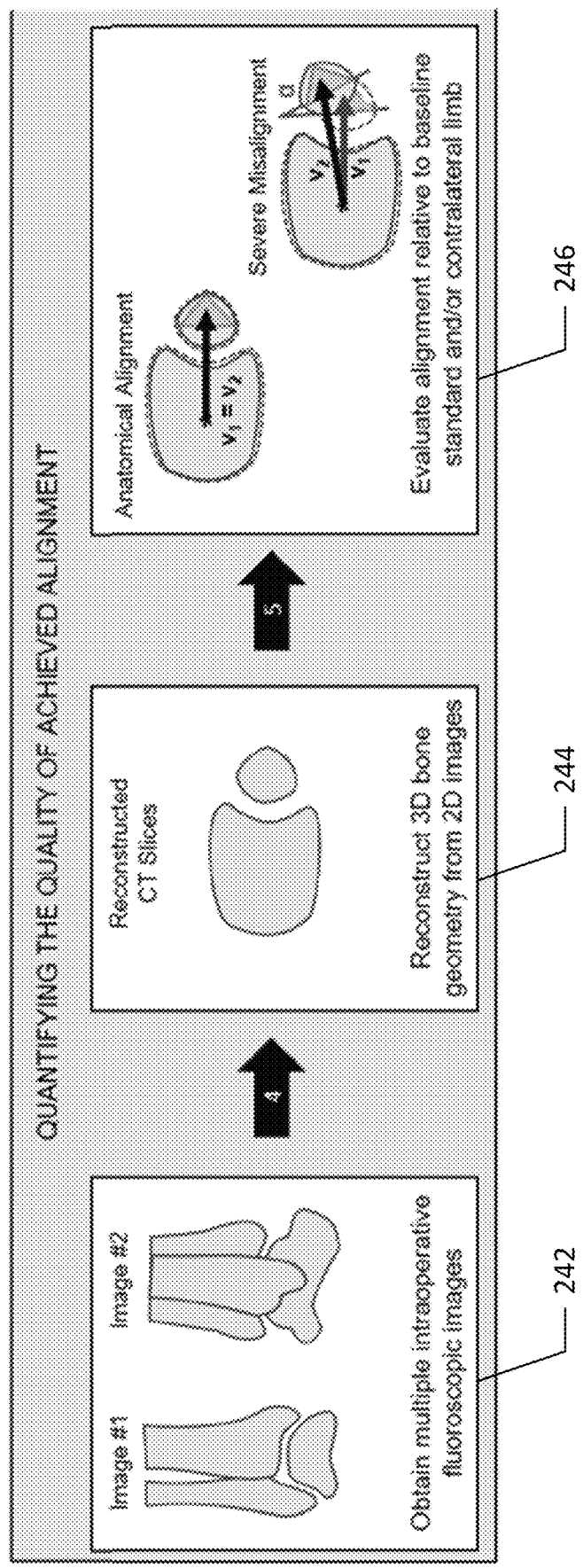
FIG. 7 is a diagram of a process for quantifying the quality of achieved alignment from syndesmosis fixation according to an example embodiment of the present disclosure.

Following surgical fixation of the tibia and fibula, surgeons generally rely on intraoperative two-dimensional imaging (e.g., fluoroscopy) and the surgeon's clinical judgement to assess whether or not anatomical alignment has been achieved. However, the use of three-dimensional imaging (e.g., CT scans) for assessing anatomical alignment is more accurate and beneficial. Such three-dimensional imaging is not available in most operating rooms. Embodiments described herein provide a method to use readily available two-dimensional imaging to assess alignment through a novel three-dimensional metric as depicted in FIG. 7. Initially, multiple two-dimensional imaging views are obtained intraoperatively as shown at 242. Through the application of machine learning and image registration, the three-dimensional bone geometry can be reconstructed as shown at 244. The quality of the tibiofibular alignment can then be quantitively assessed as shown in 246. This quantitive assessment uses vectors from the centroid of the tibia to the centroid of the fibula to calculate the translation and rotation between the fixed limb and a baseline. The baseline is shown in element 246 as the dashed line with the fixed limb in solid lines. As depicted, misalignment is found when the fixed limb does not correspond with the baseline. The baseline can be a reconstruction of the uninjured contralateral limb of the patient and/or a baseline standard representing the tibia and fibula anatomy of the general population or a subset thereof (e.g., a corresponding size/biological sex of the patient). Importantly, the vector representation enables calculation of fibular displacement in all three Cartesian planes (x, y, and z translation) and rotation about all three rotational axes.

Figure 8:
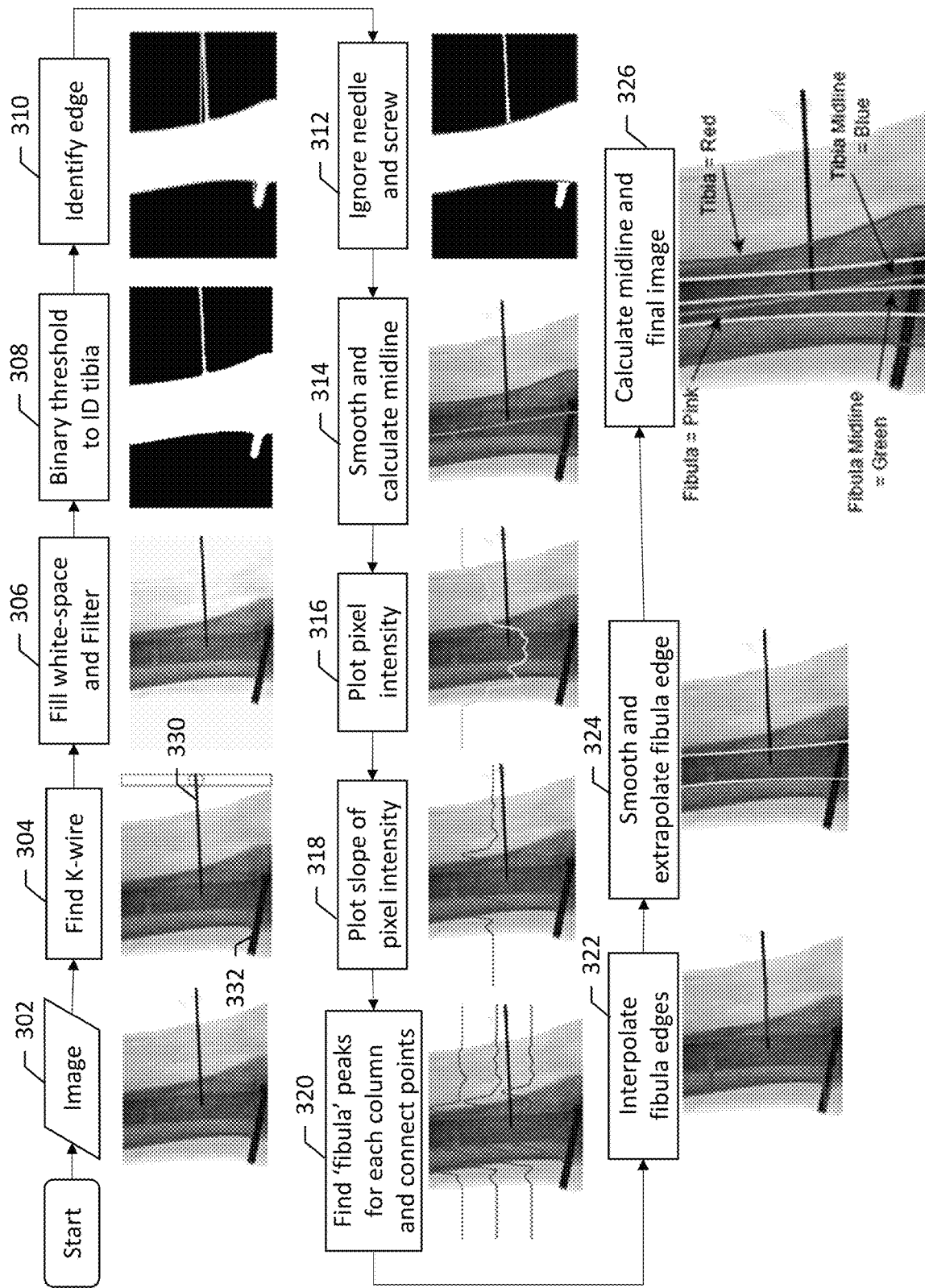
FIG. 8 is a flow diagram of a method for identifying center-center alignment of bones for syndesmosis fixation according to an example embodiment of the present disclosure.

FIG. 8 illustrates a flow diagram of an example embodiment of a process for identifying bone edges and centerlines of bones as described herein. As shown, an image is captured at 302 of a patient's tibia and fibula. In the illustrated embodiment, a Kirschner wire 330 (K-wire) and screw 332 are present in image 304. White space is filled and filtered at 306. The remaining image is binary thresholded at 308 to render the tibia easily identifiable. At 310 the edges of the tibia are identified and at 312 the screw and K-wire are ignored as they are not relevant to the information sought. At 314, the edges are smoothed and a midline (centerline) is calculated based on the smoothed edges.

The fibula is more difficult to identify since it overlaps the tibia. Pixel intensity of the captured image of 302 is plotted at 316 in establishing the location of the fibula. The slope of pixel intensity is plotted at 318, where peaks are identified in each column as the fibula and points are connected at 320. These points are interpolated at 322 to establish fibula edges. The fibula edges are then smoothed and extrapolated at 324. From the smoothed edges of the fibula, a midline (centerline) of the fibula is established. The final image based on the aforementioned calculations illustrates the tibia edges and tibia midline along with the fibula edges and fibula midline at 326. This identification of the bone edges and establishing of the midlines is critical in establishing anatomical alignment between the fibula and tibia. The example embodiment of FIG. 8 is one approach for identifying the bone edges and bone centerlines from two-dimensional images as described herein.

Figure 9:
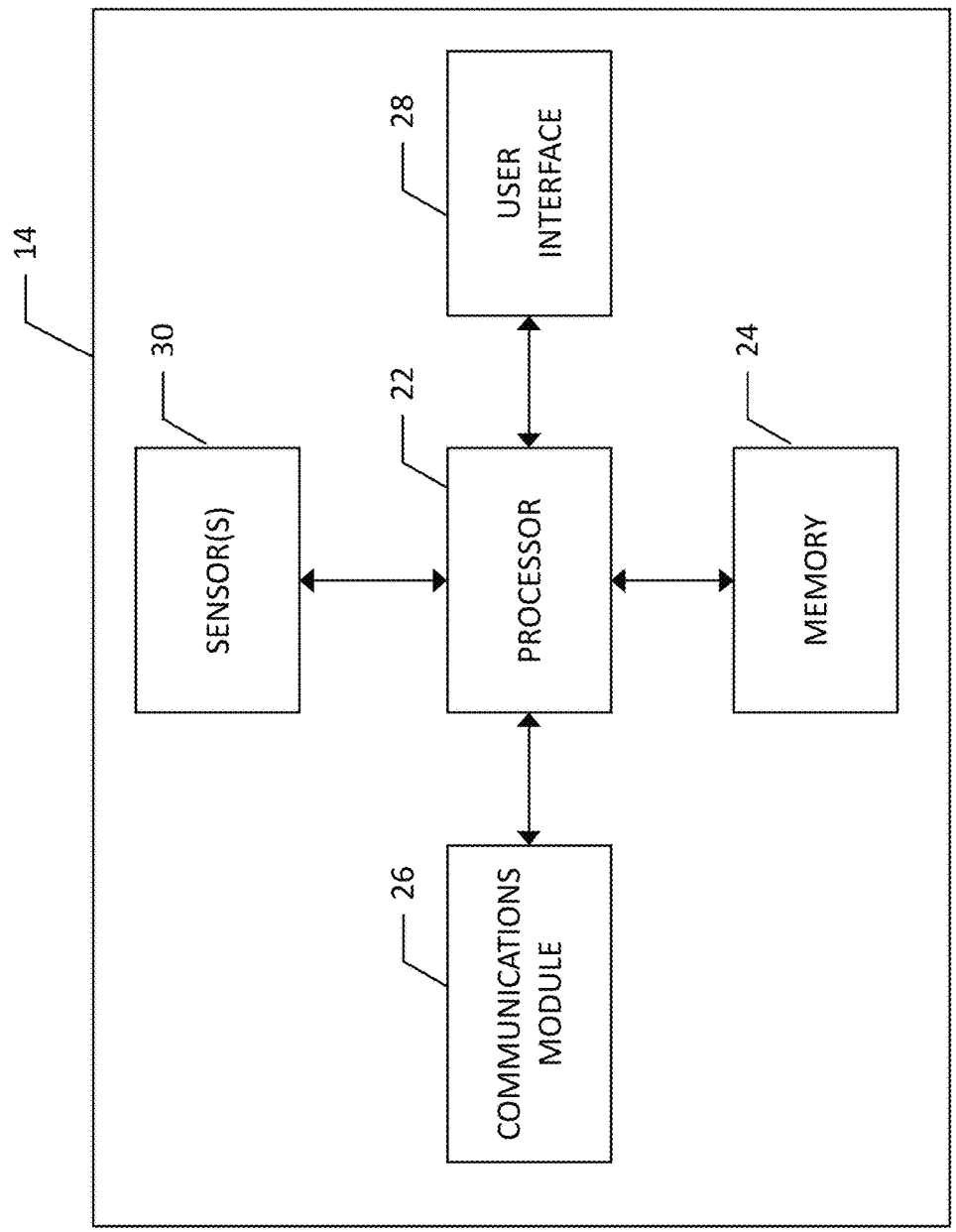
FIG. 9 is a schematic diagram of an example of an apparatus configured to process images and to identify bone edges and centerlines according to an example embodiment of the present disclosure.

FIG. 9 is a schematic diagram of an example of an apparatus 14 configured to process images and to identify bone edges and centerlines as described herein. The apparatus 14 may include or otherwise be in communication with a processor 22, a memory 24, a communication module 26, and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory 24 via a bus for passing information among components of the apparatus. The memory 24 may include, for example, one or more volatile and/or non-volatile memories. In other words, for example, the memory 24 may be an electronic storage device (e.g., a computer readable storage medium) comprising gates configured to store data (e.g., bits) that may be retrievable by a machine (e.g., a computing device like the processor). The memory 24 may be configured to store information, data, content, applications, instructions, or the like for enabling the apparatus 14 to carry out various functions in accordance with an example embodiment of the present disclosure. For example, the memory 24 could be configured to buffer input data for processing by the processor 22. Additionally or alternatively, the memory could be configured to store instructions for execution by the processor.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 22 may be configured to execute instructions stored in the memory 24 or otherwise accessible to the processor 22. Alternatively or additionally, the processor 22 may be configured to execute hard coded functionality. As such, whether configured by hardware or software methods, or by a combination thereof, the processor 22 may represent an entity (e.g., physically embodied in circuitry) capable of performing operations according to an embodiment of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the algorithms and/or operations described herein when the instructions are executed. However, in some cases, the processor 22 may be a processor of a specific device (e.g., a head-mounted display) configured to employ an embodiment of the present invention by further configuration of the processor 22 by instructions for performing the algorithms and/or operations described herein. The processor 22 may include, among other things, a clock, an arithmetic logic unit (ALU) and logic gates configured to support operation of the processor 22. In one embodiment, the processor 22 may also include user interface circuitry configured to control at least some functions of one or more elements of the user interface 28.

The communication module 26 may include various components, such as a device or circuitry embodied in either hardware or a combination of hardware and software that is configured to receive and/or transmit data for communicating data between the apparatus 14 and various other entities, such as a teleradiology system, a database, a medical records system, or the like. In this regard, the communication module 26 may include, for example, an antenna (or multiple antennas) and supporting hardware and/or software for enabling communications wirelessly. Additionally or alternatively, the communication module 26 may include the circuitry for interacting with the antenna(s) to cause transmission of signals via the antenna(s) or to handle receipt of signals received via the antenna(s). For example, the communications module 26 may be configured to communicate wirelessly such as via Wi-Fi (e.g., vehicular Wi-Fi standard 802.11p), Bluetooth, mobile communications standards (e.g., 3G, 4G, or 5G) or other wireless communications techniques. In some instances, the communications module 26 may alternatively or also support wired communication, which may communicate with a separate transmitting device (not shown). As such, for example, the communications module 26 may include a communication modem and/or other hardware/software for supporting communication via cable, digital subscriber line (DSL), universal serial bus (USB) or other mechanisms. For example, the communications module 26 may be configured to communicate via wired communication with other components of a computing device.

The user interface 28 may be in communication with the processor 22, such as the user interface circuitry, to receive an indication of a user input and/or to provide an audible, visual, mechanical, or other output to a user. As such, the user interface 28 may include, for example, one or more buttons, light-emitting diodes (LEDs), a display, a speaker, and/or other input/output mechanisms. The user interface 28 may also be in communication with the memory 24 and/or the communication module 26, such as via a bus. The user interface 28 may include an interface through which a surgeon or other entity can review and interact with two-dimensional and three-dimensional imagery, for example.

The communications module 26 may facilitate communication between the apparatus 14 and imaging devices, tele-radiologists, remote physicians, or other network-connected entities. The communications module 26 may be capable of operating in accordance with various first generation (1G), second generation (2G), 2.5G, third-generation (3G) communication protocols, fourth-generation (4G) communication protocols, fifth-generation (5G) communication protocols, Internet Protocol Multimedia Subsystem (IMS) communication protocols (e.g., session initiation protocol (SIP)), and/or the like. For example, a mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like.

The controller may optionally include or be connected to one or more sensors 30, which may include image sensors, such as Magnetic Resonance Imaging (MRI) sensors, Computed Tomography (CT) sensors, x-ray sensors, fluoroscopy sensors, etc. These imaging sensors may be coupled to the apparatus 14 or may be in communication via communications module 26, for example.

Figure 10:
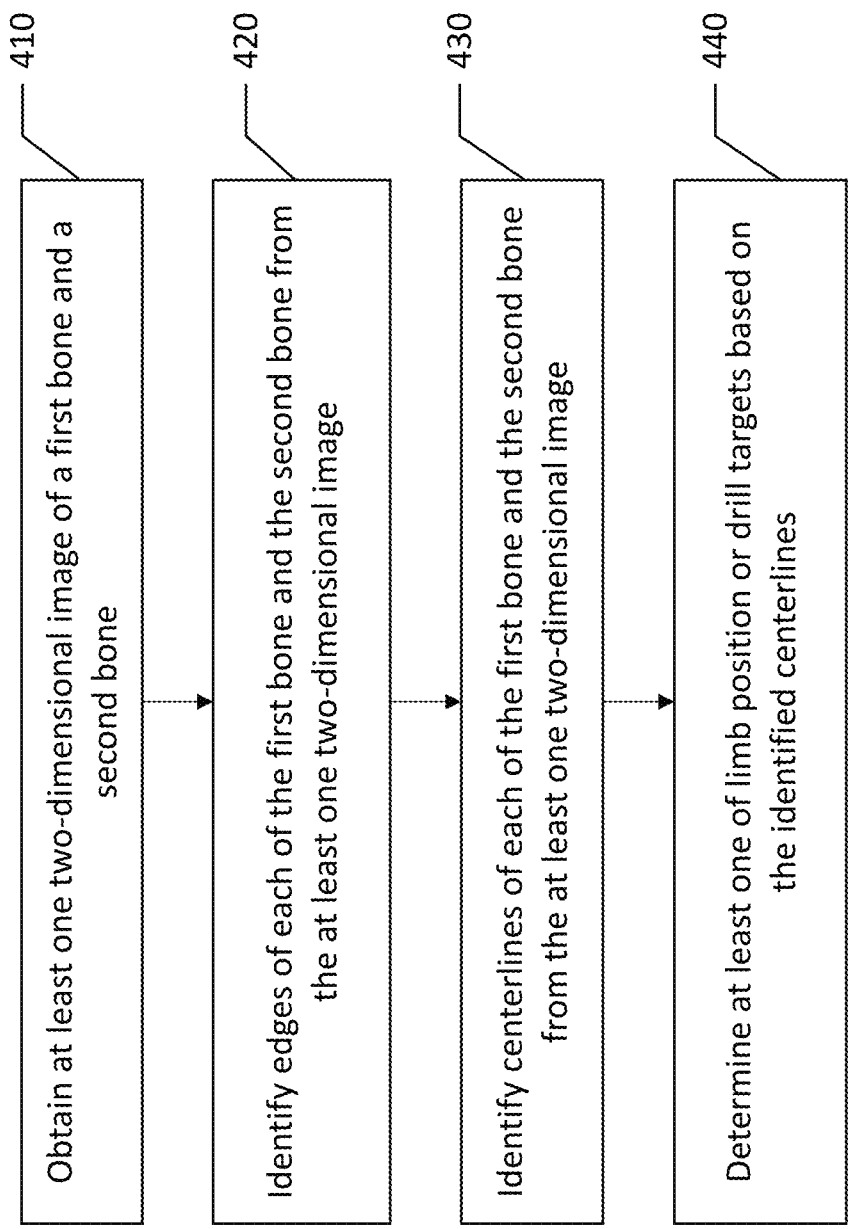
FIG. 10 is a flowchart of a method for alignment of a first bone and a second bone for syndesmosis fixation according to an example embodiment of the present disclosure.

FIG. 10 illustrates a flowchart of a method according to an example embodiment of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 24 of an apparatus employing an embodiment of the present invention and executed by the processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

According to the flow chart of FIG. 10, at least one image is obtained at 410 of a first bone and a second bone. The bones of the image may include, for example, a fibula and tibia for syndesmosis fixation. Edges of each of the first bone and the second bone are identified from the at least one two-dimensional image as shown at 420. This edge detection may be performed digitally by software as described above through image parsing and analysis to accurately and repeatably identify the bone edges with a high degree of efficiency and in real time as necessary for real-time feedback to a surgeon, for example. The centerlines of each of the first bone and the second bone are identified from the at least one two-dimensional image as shown at 430. This may also be performed digitally by software, such as by apparatus 14, in real time to enable a surgeon to position and reposition an image capture device (e.g., for fluoroscopic imaging) or a limb of a patient. As shown at 440, at least one of limb position or drill targets are determined based on the identified centerlines. The limb position and/or drill targets may be identified also by software such as by apparatus 14 to enable a surgeon to efficiently and effectively perform syndesmosis fixation. Embodiments can separately determine limb position, determine drill targets, or both limb position and drill targets.

In an example embodiment, an apparatus for performing the method of FIG. 10 above may comprise a processor (e.g., the processor 22) configured to perform some or each of the operations (410-440) described above. The processor may, for example, be configured to perform the operations (410-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-440 may comprise, for example, the processor 22 and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising processing circuitry and at least one memory including computer program code, the at least one memory and the computer program code configured to, with the processing circuitry, cause the apparatus to at least:
   obtain at least one two-dimensional image of a first bone and a second bone, wherein the second bone overlaps the first bone in the at least one two-dimensional image;
   apply a binary threshold to the at least one two-dimensional image to identify edges of the first bone;
   identify edges of the second bone from the at least one two-dimensional image;
   identify centerlines of each of the first bone and the second bone from the at least one two-dimensional image; and
   determine at least one of limb position or drill targets based on an overlap of the identified centerlines.

2. The apparatus of claim 1, wherein causing the apparatus to obtain the at least one two-dimensional image of the first bone and the second bone comprises causing the apparatus to obtain two or more two-dimensional images captured from at least two different angles of the first bone and the second bone, wherein the apparatus is further caused to:
   generate at least one of a three-dimensional reconstruction or a digitally reconstructed radiograph of the first bone and the second bone from the two or more two-dimensional images.

3. The apparatus of claim 1, wherein the first bone and the second bone are a pair of bones requiring syndesmosis fixation.

4. The apparatus of claim 1, wherein causing the apparatus to identify edges of each of the first bone comprises causing the apparatus to:
   filter the at least one two-dimensional image to obtain a filtered image;
   apply a binary threshold to the filtered image to obtain a binary image; and
   identify edges of the first bone from the binary image.

5. The apparatus of claim 1, wherein causing the apparatus to identify edges of the second bone comprises causing the apparatus to:
   determine pixel density within the at least one two-dimensional image to identify edges of the second bone.

6. The apparatus of claim 5, wherein the edges of the second bone are disposed between the edges of the first bone in the at least one two-dimensional image.

7. The apparatus of claim 1, wherein in response to the first bone being fixed to the second bone to become a fixed limb, the apparatus is further caused to:
   calculate translation and rotation between the fixed limb and a baseline limb using vectors from a centroid of the first bone to a centroid of the second bone; and
   provide an indication of alignment between the first bone and the second bone based on the calculated translation and rotation.

8. The apparatus of claim 1, wherein the apparatus is further caused to:
   generate at least one mark on the at least one two-dimensional image defining a point on at least one of the first bone or the second bone for a drilling location.

9. The apparatus of claim 1, wherein the apparatus is further caused to:
   provide feedback to a surgeon regarding how to change position of a limb containing the first bone and the second bone relative to an image capture device of the at least one two-dimensional image to obtain alignment between the identified centerlines.

10. The apparatus of claim 1, wherein the apparatus is further caused to:
    provide feedback to a surgeon including interactive drill targeting of a location on at least one of the first bone and the second bone.

11. The apparatus of claim 1, wherein the at least one two-dimensional image is at least one radiographic image, wherein the edges of the second bone are disposed between the edges of the first bone in the at least one radiographic image, wherein causing the apparatus to identify edges of the second bone from the at least one two-dimensional image comprises causing the apparatus to:
    plot pixel density within the at least one radiographic image; and
    interpolate the edges of the second bone based on the pixel density.

12. A computer program product comprising at least one non-transitory computer-readable storage medium having computer-executable program code portions stored therein, the computer-executable program code portions comprising program code instructions configured to:
    obtain at least one two-dimensional image of a first bone and a second bone, wherein the second bone overlaps the first bone in the at least one two-dimensional image;
    apply a binary threshold to the at least one two-dimensional image to identify edges of the first bone;
    identify edges of the second bone from the at least one two-dimensional image;
    identify centerlines of each of the first bone and the second bone from the at least one two-dimensional image; and
    determine at least one of limb position or drill targets based on an overlap of the identified centerlines.

13. The computer program product of claim 12, wherein the program code instructions to obtain at least one two-dimensional image of a first bone and a second bone comprise program code instructions to obtain two or more two-dimensional images captured from at least two different angles of the first bone and the second bone, wherein the computer program product further comprises program code instructions to:
    generate at least one of a three-dimensional reconstruction or a digitally reconstructed radiograph of the first bone and the second bone from the two or more two-dimensional images.

14. The computer program product of claim 12, wherein the first bone and the second bone are a pair of bones requiring syndesmosis fixation.

15. The computer program product of claim 12, wherein the program code instructions to identify edges of the second bone comprise program code instructions to:
   determine pixel density within the at least one two-dimensional image to identify edges of the second bone.

16. The computer program product of claim 15, wherein the edges of the second bone are disposed between the edges of the first bone in the at least one two-dimensional image.

17. The computer program product of claim 12, further comprising program code instructions to:
   generate at least one mark on the at least one two-dimensional image defining a point on at least one of the first bone or the second bone for a drilling location.

18. The computer program product of claim 12, further comprising program code instructions to:
   provide feedback to a surgeon regarding how to change position of a limb containing the first bone and the second bone relative to an image capture device of the at least one two-dimensional image to obtain alignment between the identified centerlines.

19. The computer program product of claim 12, further comprising program code instructions to:
   provide feedback to a surgeon including interactive drill targeting of a location on at least one of the first bone and the second bone.

* * * * *